United States Patent [19]
Bauer

[11] 4,415,194
[45] Nov. 15, 1983

[54] VEHICLE HATCHBACK CLOSURE

[75] Inventor: Steven W. Bauer, Utica, Mich.

[73] Assignee: General Motors Corporation, Detroit, Mich.

[21] Appl. No.: 323,252

[22] Filed: Nov. 20, 1981

[51] Int. Cl.³ .............................................. B60R 5/04
[52] U.S. Cl. ...................................... 296/76; 296/56; 292/338
[58] Field of Search ............... 296/56, 146, 76, 37.16; 292/338

[56] References Cited

U.S. PATENT DOCUMENTS

| 3,883,126 | 5/1975 | Nicholls | 296/76 |
| 3,909,060 | 9/1975 | Katayama | 296/76 |
| 3,977,712 | 8/1976 | Northrop | 292/338 |

FOREIGN PATENT DOCUMENTS

| 1403032 | 5/1964 | France | 296/56 |
| 1444214 | 5/1965 | France | 296/56 |

*Primary Examiner*—Robert R. Song
*Attorney, Agent, or Firm*—Charles E. Leahy

[57] ABSTRACT

A closure panel arrangement for a vehicle hatchback opening includes a pair of hinges which mount a glass panel on the vehicle body for movement between positions opening and closing the opening. A tail member is mounted on the end of the glass panel opposite the hinges and mounts a latch element for latching the glass panel in the closed position. A pair of telescoping struts act between the vehicle body and the tail member to bias the glass panel and tail member to the pivotally raised open position. A decorative molding extends around the edge of the glass panel from the tail member to the hinges so that the telescoping struts and the decorative molding cooperate to hold the tail member at the pivotally raised position in the event of breakage of the glass panel in the open position. A rotation-limiting device is provided in the connection between the telescoping struts and the tail member so that downward rotation of the tail member about its point of attachment with the struts is prevented.

2 Claims, 5 Drawing Figures

VEHICLE HATCHBACK CLOSURE

The invention relates to a hinged glass closure panel for a vehicle body hatchback luggage compartment opening and more particularly provides rotation limiting means in connection between telescoping struts and a tail member mounted on the glass panel so that the tail member is prevented from rotation about its point of attachment with the struts in the event of breakage of the glass panel.

BACKGROUND OF THE INVENTION

It is well-known in motor vehicle bodies to provide a hatchback opening which provides both a rear window opening and an opening for access to the luggage compartment.

It is also known to provide a glass panel hingedly mounted on the vehicle roof for movement between positions opening and closing the hatchback opening. A tail membr of stamped steel or molded plastic construction is mounted at the rear end of the glass panel and mounts a latch striker for latching with a latch mounted on the vehicle body to latch the glass panel in the closed position. A pair of telescoping struts are conventionally provided between the vehicle body and the tail member to bias the glass panel to a pivotally raised open position.

It is also known to provide a decorative molding which extends around the edge of the glass panel and is attached to both the tail member and the hinges so that the decorative molding and the telescoping struts cooperate to hold the tail member at the angularly raised position in the event of breakage of the glass panel.

The foregoing conventional arrangement of a hatchback closure has proven successful in motor vehicle applications where the tail member has a relatively light weight and is connected with the telescoping struts at or near its center of gravity so that the tail member remains supported at the angularly raised position by the decorative molding in the event of breakage of the glass panel.

In some motor vehicle bodies, various design and structural considerations require that the telescoping struts be mounted to the tail member at a point substantially forward from the center of gravity of the tail member. Accordingly, in the event of breakage of the glass panel, gravity acting on the tail member may cause a downward rotational force which exceeds the strength of the decorative molding. Furthermore, the mounting of an air deflecting spoiler or a wiper assembly on the tail member may add substantial weight which increases the tendency for downward rotation of the tail member.

The object, feature and advantage of the present invention resides in improvements to the construction of a glass hatchback closure panel construction so that the tail member is supported against downward pivotal rotation about its point of attachment to the telescoping struts irrespective of the tail member having a substantial weight spaced from the point of attachment between the tail member and the telescoping struts.

More particularly, the object, feature and advantage of the present invention resides in the provision of a rotation limiting device in the connection between the telescoping struts and the tail member so that the tail member cannot rotate downwardly about its point of attachment with the struts as would be otherwise be permitted by bending of the decorative molding upon breakage of the glass panel.

SUMMARY OF THE INVENTION

According to the present invention, a pair of hinges mount a glass panel on the vehicle body for movement between positions opening and closing the vehicle opening. A tail member is mounted on the end of the glass panel opposite the hinges and mounts a latch element for latching the glass panel in the closed position. A pair of telescoping struts act between the vehicle body and the tail member to bias the glass panel and tail member to the pivotally raised open position. A decorative molding extends around the edge of the glass panel from the tail member to the hinges so that the telescoping struts and the decorative molding cooperate to hold the tail member at the pivotally raised position in the event breakage of the glass panel in the open position. A rotation-limiting device is provided in the connection between the telescoping struts and the tail member so that downward rotation of the tail member about its point of attachment with the struts is prevented

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
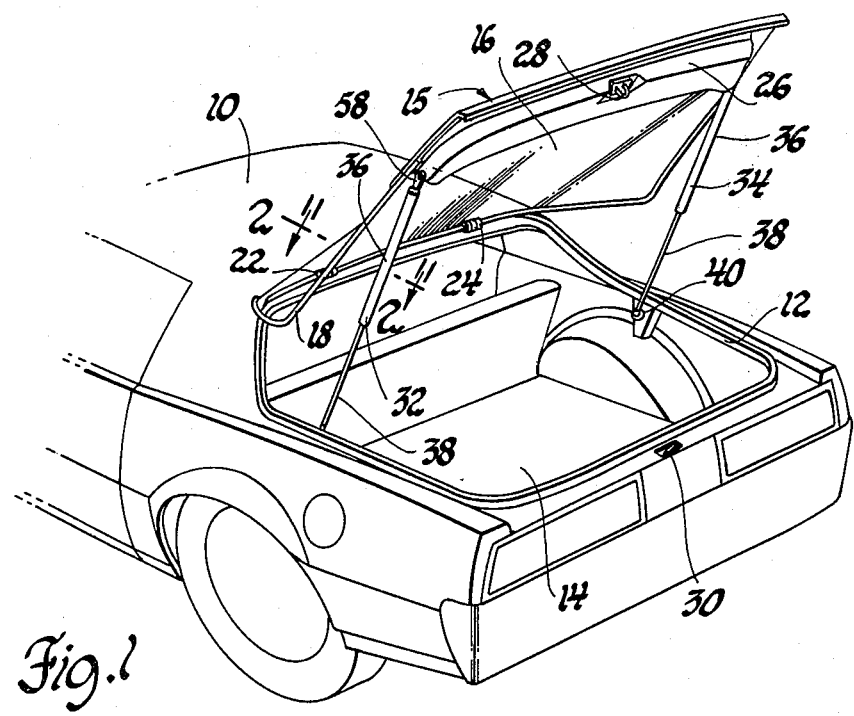
FIG. 1 is a perspective view of a vehicle body having a hatchback closure arrangement according to the invention.
Figure 2:
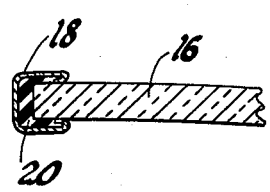
FIG. 2 is a sectional view taken in the direction of arrows 2—2 of FIG. 1 showing the edge of the glass panel and the decorative molding extending around the edge of the glass panel.

Referring to FIG. 1, there is shown a vehicle body 10 having a rear hatchback opening 12 which provides a rear window opening as well as access to a luggage compartment 14. A closure panel assembly 15 is provided for closing the hatch opening 12. Referring to FIG. 2, it is seen that the closure panel assembly 15 includes a glass panel 16 having a C-shaped decorative molding 18 which extends around the edge of the glass panel 16 and is sealed to the glass panel 16 by a bead of urethane sealant 20. Referring again to FIG. 1, the front edge of glass panel 16 and the decorative molding 18 are suitably attached to the roof structure of the vehicle body 10 by a pair of hinges 22 and 24. A tail member 26 is mounted on the rear end of the glass panel 16 and carries a latch striker 28 which is engageable with a latch 30 mounted on the rear filler panel of the body 10 to retain the closure panel assembly 15 in a closed position closing the hatchback opening 12.

The tail member 26 may be comprised of stamped sheet metal panels or may be a molded plastic member.

In either case, the tail member 26 may mount a spoiler panel or a wiper assembly, not shown.

A pair of telescoping struts 32 and 34 act respectively between the vehicle body 10 and the tail member 26 to bias the closure panel assembly 15 to the open position of FIG. 1. The telescoping struts 32 and 34 are preferably a gas spring comprised of a cylinder 36 which slidably receives a piston rod 38. A gas is compressed within the cylinder 36 and seeks to expand so that the piston rod 38 is extended from the cylinder 36 to urge the closure panel assembly 15 to the open position of FIG. 1. The lower end of the piston rod 38 is pivotally attached to the vehicle body 10 by a pivot 40.

Figure 3:
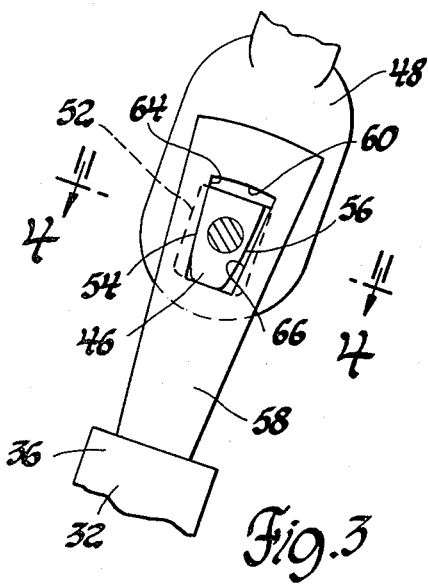
FIG. 3 is a view showing the attachment of the telescoping strut to the tail member mounted on the closure panel and having the attaching bolt broken away and in section.
Figure 4:
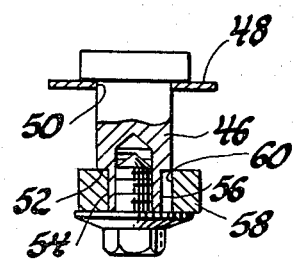
FIG. 4 is a sectional view taken in the direction of arrows 4—4 of FIG. 3 and showing the mounting stud which connects the telescoping strut to the tail member.
Figure 5:
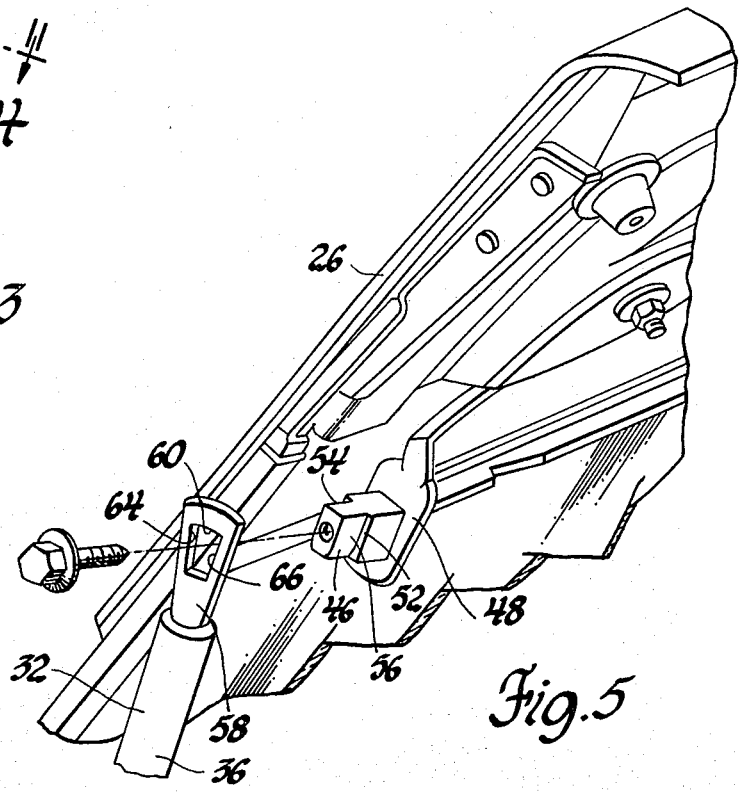
FIG. 5 is an enlarged fragmentary exploded view similar to FIG. 1.

Referring to FIGS. 3, 4 and 5, the attachment of the upper end of the cylinder 36 to the tail member 26 is shown. As best seen in FIGS. 4 and 5, a mounting stud 46 projects laterally from a bracket 48 carried at the forward edge of the tail member 26. The mounting stud 46 is generally rectangular in cross section and is nonrotatably seated in a rectangular aperture 50 of the mounting bracket 48. The mounting stud 46 is necked down at a shoulder 52 to provide opposed facing flats 54 and 56. Referring to FIGS. 3 and 5, it is seen that a bracket 58 suitably attached to the end of the cylinder 36 has an aperture 60 by which the bracket 58 is seated over the mounting stud 46 and against the shoulder 52. The aperture 60 of bracket 58 is defined in part by opposed walls 64 and 66 which are juxtaposed with the flats 54 and 56 of the mounting stud 46.

As best seen in FIGS. 3 and 4, the spacing between the aperture walls 64 and 66 is greater than the spacing between the flats 54 and 56 of the mounting stud 46 so that a limited amount of rotation is permitted between the telescoping cylinders 32 and 34 and the tail member 26. This limited amount of rotation is selected for the geometry of the particular body to accommodate the change in the angular relationship between the closure panel assembly 15 and the telescoping struts 32 and 34 during movement of the closure panel assembly between the opened and closed positions.

In a typical vehicle body having the mounting geometry shown in FIG. 1, the range of angular movement between the telescoping strut and the closure panel assembly is about 7° of rotation. However, allowing for variations in the building of the body and the tolerance stack-up in the various components, it has been found that an angular variation of about 15° should be designed into the connection between the telescoping strut and the closure panel assembly. In the event that the glass panel 16 breaks while the closure panel assembly 15 is in the open position of FIG. 1, the weight of the tail member 26 may be sufficient to somewhat straighten the decorative molding 18 from its path along the outline of the glass panel 15. However, the decorative molding 18 will function in cooperation with the extended telescoping struts 32 and 34 to maintain the tail member 26 at substantially the same elevated position as shown in FIG. 1.

Because the telescoping struts 32 and 34 are connected to the tail member 26 at the forward edge, the weight of the tail member will tend to pivot the tail member downwardly in a clockwise direction about the mounting stud 46. However, the flats 54 and 56 of the mounting studs 46 will come into wedging engagement with the walls 64 and 66 of the mounting bracket aperture 60 to substantially limit the clockwise rotation of the tail member 26. In this manner, the tail member 26 is prevented from downward rotation by the force of gravity acting thereon.

Thus, it is seen that the invention relates to the provision of a rotation limiting device between the telescoping strut and tail member of a glass closure panel to prevent rotation of the tail member downwardly about its point of attachment with the strut as permitted by bending of a decorative molding in the event of breakage of the glass panel.

The embodiments of the invention in which an exclusive property or privilege is claimed are defined as follows:

1. In combination with a vehicle body having an opening:
   a glass panel;
   hinge means mounting one end of the glass panel on the vehicle body for movement between positions opening and closing the opening;
   a tail member mounted on the glass panel at the end thereof opposite the hinged end and adapted to mount a latch element for latching the glass panel in the closed position;
   a pair of telescoping struts having first ends mounted on the vehicle body and second ends connected to the tail member to bias the glass panel to the open position;
   a decorative molding extending from the tail member to the end of the glass panel hingedly mounted on the vehicle body to cooperate with the telescoping struts in holding the tail member at the open position in the event of a breakage of the glass panel; and
   rotation limiting means in the connection between the telescoping struts and the tail member whereby the tail member is limited in rotation about the telescoping struts in the event of breakage of the glass panel and bending of the decorative molding.

2. In combination with a vehicle body having an opening:
   a glass closure panel;
   hinge means mounting the forward end of the glass closure panel on the vehicle body for movement between open and closed positions relative the vehicle body opening;
   a tail member mounted on the glass panel at the rearward end and adapted to mount a latch element for latching the glass closure panel in the closed position;
   a decorative molding extending around the edge of the glass closure panel and suitably coupled with both the hinge means and the tail member;
   a telescoping strut having a first end mounted on the vehicle body and a second end having an aperture defined by opposed facing walls;
   and a mounting stud extending from the tail member and through the aperture of the second end of the telescoping strut, said mounting stud having opposed facing walls which are spaced from the opposed facing walls defining the aperture in a manner to limit the rotation between the telescoping strut and the glass panel to an extent not substantially exceeding the angular variation of rotation therebetween during normal movement of the glass closure panel and tail member between the open and closed positions whereby in the event of breakage of the glass closure panel the tail member is restrained against downward rotation about the second end of the telescoping strut.

* * * * *